(12) United States Patent
Maki

(10) Patent No.: US 11,092,855 B2
(45) Date of Patent: Aug. 17, 2021

(54) DISPLAY APPARATUS

(71) Applicant: Mitsubishi Electric Corporation, Tokyo (JP)

(72) Inventor: Yusuke Maki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/834,606

(22) Filed: Mar. 30, 2020

(65) Prior Publication Data
US 2020/0326568 A1 Oct. 15, 2020

(30) Foreign Application Priority Data

Apr. 10, 2019 (JP) ............................ JP2019-074578

(51) Int. Cl.
*G02F 1/1333* (2006.01)
*G02F 1/1339* (2006.01)
*F21V 8/00* (2006.01)

(52) U.S. Cl.
CPC ......... *G02F 1/1339* (2013.01); *G02B 6/0081* (2013.01); *G02F 1/133308* (2013.01); *G02F 2202/28* (2013.01)

(58) Field of Classification Search
CPC .. G02B 6/0093; G02B 6/0081; G02B 6/0088; G02F 1/1339; G02F 2202/28; G02F 1/133308; G02F 1/133615; G02F 2201/50; G02F 2201/503; G02F 1/133314
See application file for complete search history.

(56) References Cited

U.S. PATENT DOCUMENTS

| 2017/0363803 A1* | 12/2017 | Nakamori | ......... G02F 1/133308 |
| 2020/0288563 A1* | 9/2020 | Nam | ..................... H05K 3/0041 |

FOREIGN PATENT DOCUMENTS

| JP | 2009-025602 A | 2/2009 |
| JP | 2017-214468 A | 12/2017 |

* cited by examiner

*Primary Examiner* — Donald L Raleigh
(74) *Attorney, Agent, or Firm* — Studebaker & Brackett PC

(57) ABSTRACT

A display apparatus includes a display panel, a mold frame, and a plurality of cushioning sealing members in which: each cushioning sealing member includes a cushioning material, a first sealing material arranged on a surface of the cushioning material that faces the display panel, and a second sealing material arranged on a surface of the cushioning material that faces the mold frame; one end side in the longitudinal direction of the first sealing material extends to the mold frame so as to cover one end surface in the longitudinal direction of the cushioning material and one end surface in the longitudinal direction of the second sealing material; and one end portion in the longitudinal direction of the first sealing material is attached to the mold frame.

10 Claims, 5 Drawing Sheets

DISPLAY APPARATUS

BACKGROUND OF THE INVENTION

Field of the Invention

The present invention relates to a display apparatus including a planar light source device that irradiates a display panel.

Description of the Background Art

Display apparatuses generally include a planar light source device that irradiates a display panel. In such a display apparatus, the display panel can be easily fixed by providing a sealing material in a portion of the planar light source device where the display panel is to be installed. When stress is applied to the display panel, unevenness occurs on the display surface and the display quality deteriorates, and hence there is a structure in which a display panel is fixed to a planar light source device by using a cushioning sealing member whose elastic cushioning material is provided with a sealing material.

Japanese Patent Application Laid-Open No. 2017-214468 discloses, in a cushioning sealing material in which a cushioning material is sandwiched by two types of sealing materials and a separator is laminated on the sealing material near to a display panel, a structure in which the sealing material near to the display panel is arranged in portions of the cushioning material, other than one end portion in the longitudinal direction of the cushioning material.

The separator is attached to the sealing material of the cushioning sealing member arranged in a planar light source device, the sealing material being located near to the display panel, and when installing the display panel in the planar light source device, a user peels off the separator from the sealing material and attaches the sealing material to the display panel.

In the technology described in Japanese Patent Application Laid-Open No. 2017-214468, when the adhesive force between the sealing material and the separator is high, a load is applied to the cushioning material when a user attempts to peel off the separator, and hence the cushioning material may start tearing from the end portion in the longitudinal direction of the sealing material. The cushioning sealing member is attached to four sides of a mold frame holding the display panel among the members constituting the planar light source device. If the cushioning material tears, it cannot hold the display panel, and when a vibration or shock is applied to the display apparatus, the display panel may move and break, or part of the torn cushioning material may appear on the display screen as a foreign matter. Therefore, there is the problem that the display apparatus becomes defective and yield decreases.

SUMMARY

An object of the present invention is to provide a display apparatus that can suppress a cushioning material from tearing when a separator of a cushioning sealing member is peeled off in order to fix a display panel to a planar light source device.

A display apparatus according to the present invention includes a display panel, a mold frame, and a plurality of cushioning sealing members. The mold frame constitutes part of a planar light source device that irradiates the display panel from the back surface side. The plurality of cushioning sealing members are arranged, between the display panel and the mold frame, at positions corresponding to the respective sides of the display panel. Each cushioning sealing member includes a cushioning material, a first sealing material arranged on a surface of the cushioning material that faces the display panel, and a second sealing material arranged on a surface of the cushioning material that faces the mold frame. One end side in the longitudinal direction of the first sealing material extends to the mold frame so as to cover one end surface in the longitudinal direction of the cushioning material and one end surface in the longitudinal direction of the second sealing material. One end portion in the longitudinal direction of the first sealing material is attached to the mold frame.

The cushioning material can be suppressed from tearing when the separator of the cushioning sealing member is peeled off in order to fix the display panel to the planar light source device.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
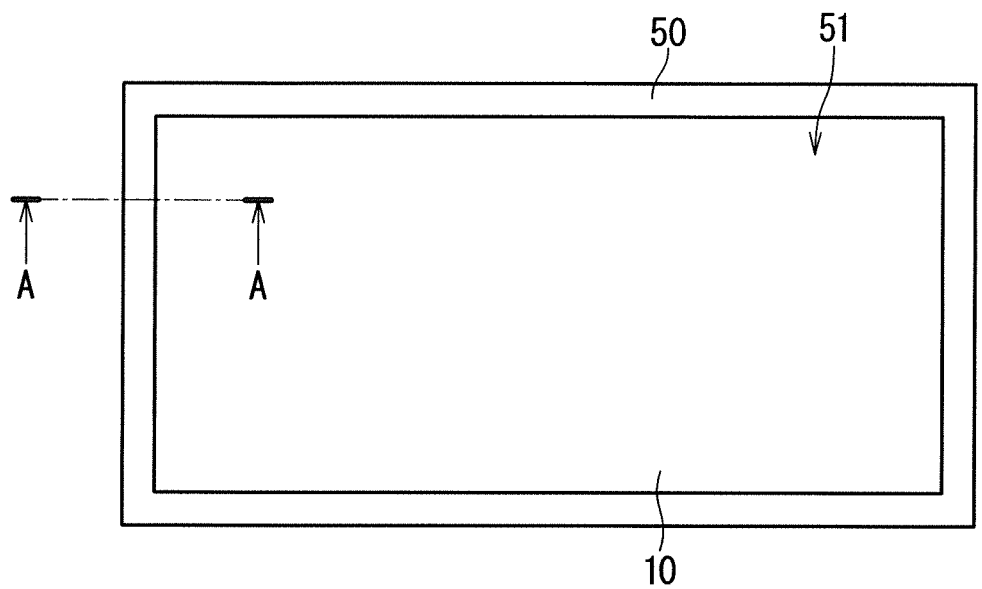
FIG. 1 is a front view of a display apparatus according to a first preferred embodiment.
Figure 2:
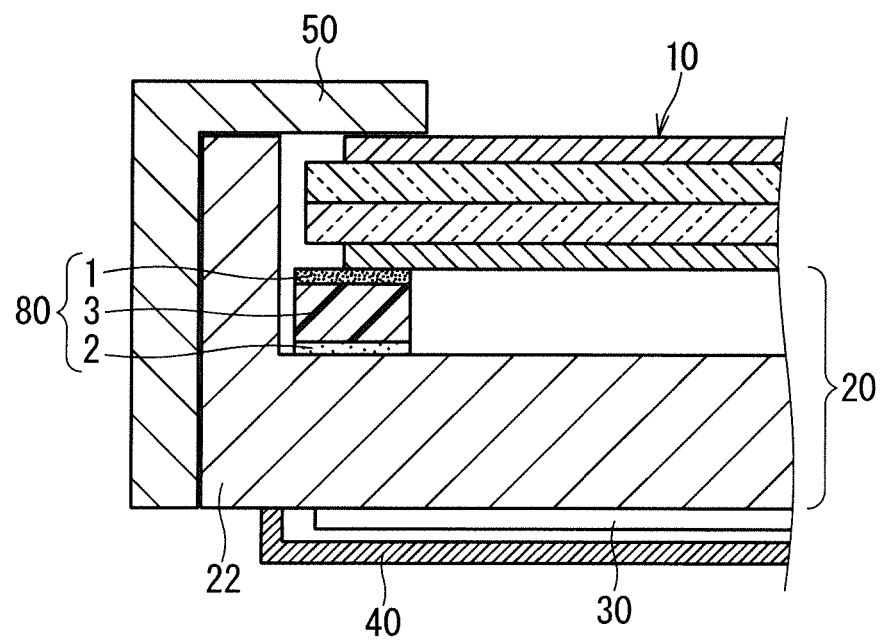
FIG. 2 is a cross-sectional view taken along line A-A of FIG. 1.

A first preferred embodiment of the present invention will be described below with reference to the drawings. FIG. 1 is a front view of a display apparatus 100 according to the first preferred embodiment. FIG. 2 is a cross-sectional view taken along line A-A of FIG. 1.

As illustrated in FIGS. 1 and 2, the display apparatus 100 includes a display panel 10, a planar light source device 20, a circuit member 30, and a shield metal 40. The planar light source device 20 is arranged on the back surface side of the display panel 10 to irradiate the display panel 10 from the back surface side. The shield metal 40 is arranged on the back surface side of the circuit member 30 arranged on the back surface of the planar light source device 20 in order to protect the circuit member 30.

The display apparatus 100 may include a front frame 50 having an opening 51 in order to protect the end portion of the display panel 10. Additionally, the display apparatus 100 may include, on the front surface of the display panel 10, a touch panel (not illustrated) through which a user can externally input a position signal to the screen and a transparent protection member (not illustrated) to protect the touch panel.

Next, each of the above members constituting the display apparatus 100 will be described. As illustrated in FIGS. 1 and 2, the display panel 10 includes a liquid crystal display panel, etc. The display panel 10 includes: a first substrate in which a CF (color filter), a light-shielding layer, a counter electrode, etc., are formed on an insulating substrate such as glass; and a second substrate in which a thin film transistor (Thin Film Transistor, hereinafter referred to as "TFT") to serve as a switching element and a pixel electrode, etc., are formed on an insulating substrate such as glass, all of which on the two substrates are formed by applying the birefringence of liquid crystal.

The display panel 10 further includes: a spacer for maintaining the distance between the first substrate and the second substrate; a sealing material for attaching the first substrate and the second substrate together; liquid crystal arranged between the two substrates; a sealing material for an inlet through which the liquid crystal is injected; an alignment film for aligning the liquid crystal; polarizing plates arranged on the outer surfaces of both the substrates; a drive IC arranged on the outer peripheral portion of the second substrate or on a tape-shaped wiring material (TCP, COF, or the like) connected to the outer peripheral portion of the second substrate; and the like.

The planar light source device 20 includes: a mold frame 22 that holds the display panel 10 at a predetermined position; a plurality (four) of cushioning sealing members 80 that fix the display panel 10 to the planar light source device 20; a frame for housing each member; a light source such as an LED; a reflection sheet that reflects the light from the light source to a light-emitting surface; a light guide plate that propagates the light from the light source and spreads it in a plane shape; a diffusion sheet that improve the brightness uniformity of the light-emitting surface; a lens sheet that increases brightness by collecting light; and a polarized reflection sheet that improves brightness by polarizing the optical axis.

Figure 3:
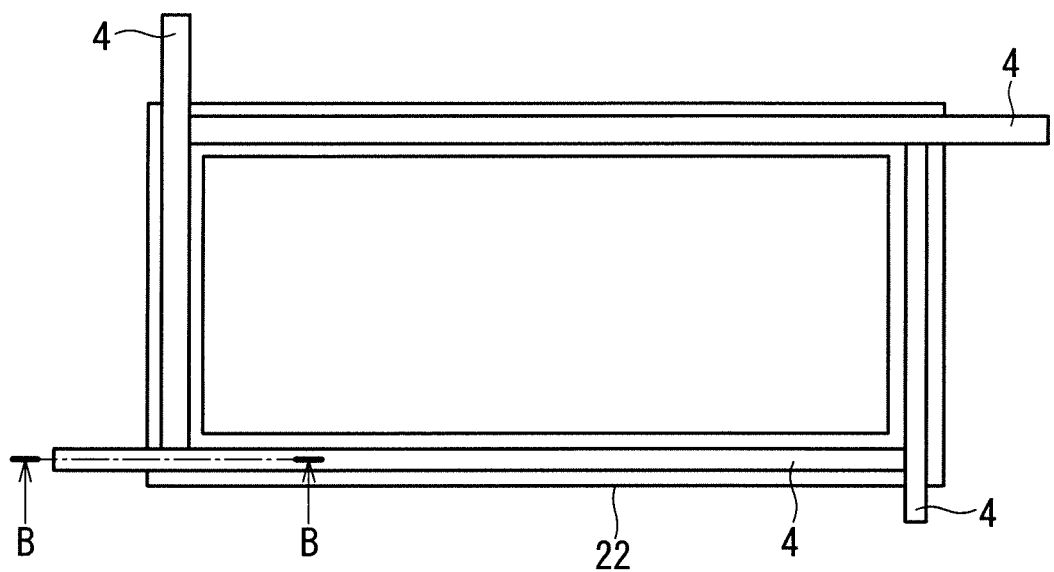
FIG. 3 is a front view illustrating a state before a separator is peeled off in a planar light source device included in the display apparatus according to the first preferred embodiment.
Figure 4:
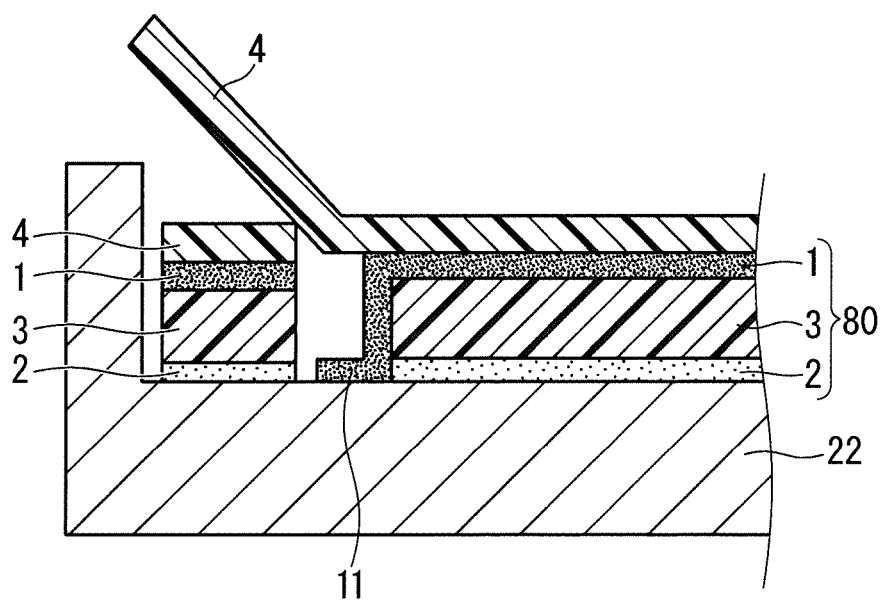
FIG. 4 is a cross-sectional view taken along line B-B of FIG. 3.

Next, the cushioning sealing member 80, a feature of the first preferred embodiment, will be described in detail. FIG. 3 is a front view illustrating a state before the separator 4 is peeled off in the planar light source device 20 included in the display apparatus 100 according to the first preferred embodiment. FIG. 4 is a cross-sectional view taken along line B-B of FIG. 3. FIG. 3 illustrates, in the display apparatus 100, a state before the display panel 10 is arranged in the planar light source device 20.

As illustrated in FIGS. 3 and 4, four cushioning sealing members 80 for adhering the display panel 10 are arranged on the front surface of the mold frame 22 constituting part of the planar light source device 20. That is, each cushioning sealing member 80 is arranged, between the display panel 10 (see FIG. 2) and the mold frame 22, at a position corresponding to each side of the display panel 10.

Each cushioning sealing member 80 has a long shape in front view, and the four cushioning sealing members 80 are adhered to the four sides of the mold frame 22, respectively. Each cushioning sealing member 80 includes a cushioning material 3, a sealing material 1 as a first sealing material, and a sealing material 2 as a second sealing material. The sealing material 1 is arranged on a surface of the cushioning material 3 that faces the display panel 10 in order to adhere the display panel 10 and the cushioning material 3 together. The sealing material 2 is arranged on a surface of the cushioning material 3 that faces the mold frame 22 in order to adhere the cushioning material 3 and the mold frame 22 together. Before the display panel 10 is fixed to the planar light source device 20, the separator 4 is attached to the surface of the sealing material 1, that is, to the surface facing the display panel 10.

Although details will be described later, in the cushioning sealing member 80, the sealing material 2 arranged on the mold frame 22 side and one end portion 11 in the longitudinal direction of the sealing material 1 arranged on the display panel 10 side (hereinafter, also referred to as the "one end portion 11 of the sealing material 1") are attached to the surface of the mold frame 22. One end side of the sealing material 1 extends longer than one end side in the longitudinal direction of the cushioning material 3, and the one end portion 11 of the sealing material 1 protrudes from the one end portion in the longitudinal direction of the cushioning material 3.

The sealing material 1 is formed of a material having an adhesive strength on each of both surfaces. The one end portion 11 of the sealing material 1 is arranged at a position not in contact with the cushioning material 3. Specifically, the one end side in the longitudinal direction of the sealing material 1 extends to the mold frame 22 so as to cover the one end surface in the longitudinal direction of the cushioning material 3 and the one end surface in the longitudinal direction of the sealing material 2. The one end portion 11 of the sealing material 1 is attached to the surface of the mold frame 22 in a state in which the one end side in the longitudinal direction of the sealing material 1 is extended along the one end surface in the longitudinal direction of the cushioning material 3 and the one end surface in the longitudinal direction of the sealing material 2.

The cushioning material 3 is a foam formed of a material having a desired elasticity, such as, for example, acrylic or polypropylene, so that no stress is applied to the display panel 10 when the display panel 10 is fixed to the planar light source device 20. The surface of the cushioning material 3 that faces the display panel 10 is entirely covered with the sealing material 1, and the surface facing the mold frame 22 is entirely covered with the sealing material 2.

The sealing material 2 is formed of a material having an adhesive strength on each of both surfaces, and is arranged on the surface opposite to the sealing material 1 via the cushioning material 3. The sealing material 2 is formed of a material having a different adhesive strength from that of the sealing material 1. Specifically, the sealing material 1 is formed of a material having an adhesive strength lower than that of the sealing material 2. For example, the peeling adhesive strength of the sealing material 1 is approximately one third of that of the sealing material 2.

The separator 4 is a peeling member that can be easily peeled off from the sealing material 1, which is made, for example, by coating a silicon-based resin or a fluorine-based resin on PET. With extended in the longitudinal direction of the cushioning sealing member 80 longer than the cushioning material 3 and the sealing materials 1 and 2, the separator 4 can be easily peeled off from the sealing material 1 by pinching with fingers. Specifically, the one end side in the longitudinal direction of the separator 4 is formed to be longer than the one end side in the longitudinal direction of the cushioning material 3, so a user peels off the separator 4 from the sealing material 1 by pinching with fingers the one end side in the longitudinal direction of the separator 4. The separator 4 is peeled off from the planar light source device 20 when the display panel 10 and the planar light source device 20 are attached together.

As described above, the display apparatus 100 according to the first preferred embodiment includes: the display panel 10; the mold frame 22 constituting part of the planar light source device 20 that irradiates the display panel 10 from the back surface side; and a plurality of the cushioning sealing members 80 arranged, between the display panel 10 and the mold frame 22, at positions corresponding to the respective sides of the display panel 10, in which: each cushioning sealing member 80 includes the cushioning material 3, the sealing material 1 arranged on the surface of the cushioning material 3 that faces the display panel 10, and the sealing material 2 arranged on the surface of the cushioning material 3 that faces the mold frame 22; the one end side in the longitudinal direction of the sealing material 1 extends to the mold frame 22 so as to cover the one end surface in the longitudinal direction of the cushioning material 3 and the one end surface in the longitudinal direction of the sealing material 2; and the one end portion 11 in the longitudinal direction of the sealing material 1 is attached to the mold frame 22.

Therefore, when compared with a general cushioning sealing member in which sealing materials are arranged on a surface of the cushioning material 3 that faces the display panel 10 and on a surface of the cushioning material 3 that faces the mold frame 22, the cushioning sealing member 80 has a structure in which the cushioning material 3 does not contact the one end portion 11 of the sealing material 1 from which the cushioning material 3 may start tearing, and hence the separator 4 of the cushioning sealing member 80 can be easily peeled off from the sealing material 1 when the separator 4 is peeled off to fix the display panel 10 to the planar light source device 20, whereby the cushioning material 3 can be suppressed from tearing.

If the cushioning material 3 tears when the separator 4 is peeled off, and if the display panel 10 is fixed to the planar light source device 20 in this state, a failure may occur when a vibration or impact is applied to the display apparatus 100, in which: the display panel 10 may move and break; part of the torn cushioning material 3 may appear on the display screen as a foreign matter; or the like. Therefore, the planar light source device 20 becomes defective when the cushioning material 3 tears at the time of peeling off the separator 4, but in the present first preferred embodiment, the cushioning material 3 is suppressed from tearing, whereby the yield of the planar light source device 20 and consequently the yield of the display apparatus 100 are improved.

Further, the sealing materials 1 and 2 are formed of materials having different adhesive strengths, and hence the sealing materials 1 and 2 can be selected according to adherends. For example, by reducing the adhesive strength of the sealing material 1 to be arranged on the display panel 10 side, the display panel 10 can be easily removed from the planar light source device 20 after the display panel 10 and the planar light source device 20 are once attached together. Thereby, when a foreign matter enters between the display panel 10 and the planar light source device 20, etc., the display panel 10 can be easily removed from the planar light source device 20, whereby the reworkability of the display apparatus 100 is improved.

Second Preferred Embodiment

Figure 5:
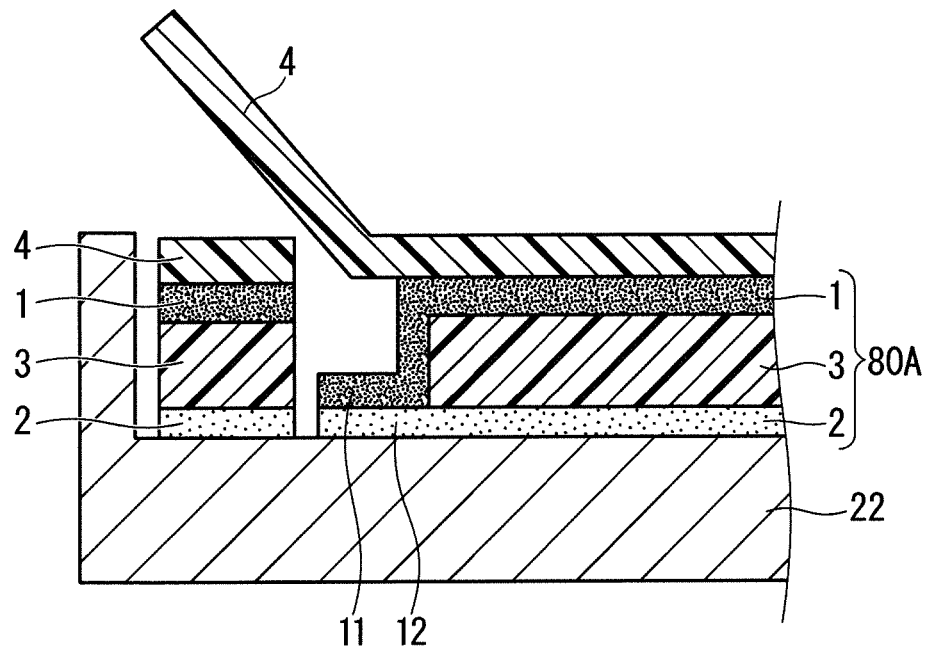
FIG. 5 is a view corresponding to FIG. 4, according to a second preferred embodiment.

Next, a display apparatus 100 according to a second preferred embodiment will be described. FIG. 5 is a view corresponding to FIG. 4, according to the second preferred embodiment. In the second preferred embodiment, the same components as those described in the first preferred embodiment are denoted by the same reference numerals, and description thereof is omitted.

In the second preferred embodiment, the display apparatus 100 includes a planar light source device 20A, and the planar light source device 20A includes four cushioning sealing members 80A, as illustrated in FIG. 5. One end side in the longitudinal direction of the sealing material 2 extends longer than one end side in the longitudinal direction of the cushioning material 3. One end side in the longitudinal direction of the sealing material 1 extends to the sealing material 2 so as to cover one end surface in the longitudinal direction of the cushioning material 3. The one end portion 11 in the longitudinal direction of the sealing material 1 is attached to one end portion 12 in the longitudinal direction of the sealing material 2 in a state in which the one end side in the longitudinal direction of the sealing material 1 is extended along the one end surface in the longitudinal direction of the cushioning material 3. Therefore, the sealing material 2 is only attached to the surface of the mold frame 22.

As described above, in the display apparatus 100 according to the second preferred embodiment, the one end side in the longitudinal direction of the sealing material 2 extends longer than the one end side in the longitudinal direction of the cushioning material 3, and the one end side in the longitudinal direction of the sealing material 1 extends to the sealing material 2 so as to cover the one end surface in the longitudinal direction of the cushioning material 3, and the one end portion 11 in the longitudinal direction of the sealing material 1 is attached to the one end portion 12 in the longitudinal direction of the sealing material 2.

Therefore, the one end portion 11 of the sealing material 1 can be fixed to a position not in contact with the cushion material 3, even when the sealing material 1 is difficult to adhere to the mold frame 22.

Third Preferred Embodiment

Figure 6:
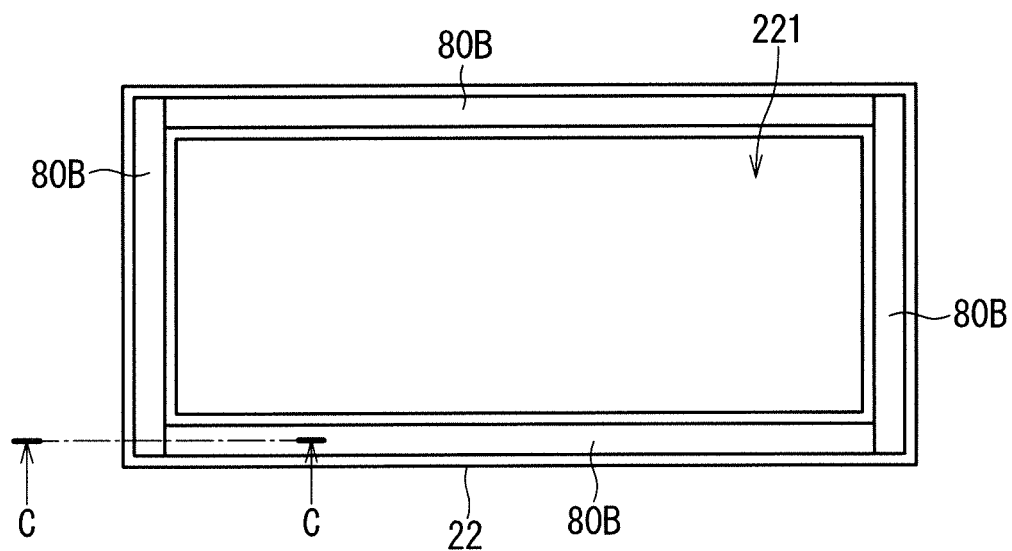
FIG. 6 is a front view of a planar light source device included in a display apparatus according to a third preferred embodiment.
Figure 7:
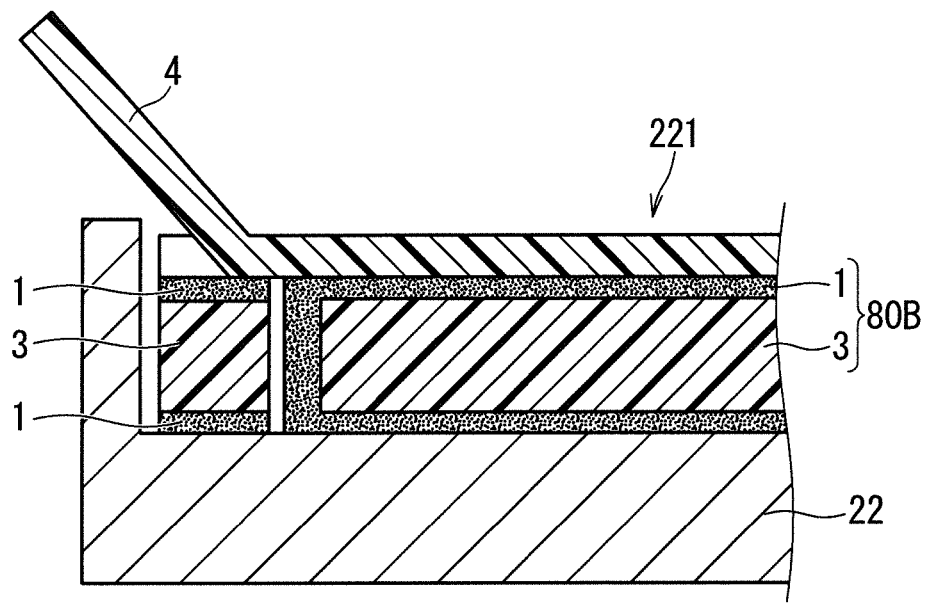
FIG. 7 is a cross-sectional view taken along line C-C of FIG. 6.

Next, a display apparatus 100 according to a third preferred embodiment will be described. FIG. 6 is a front view of a planar light source device 20B included in the display apparatus 100 according to the third preferred embodiment. FIG. 7 is a cross-sectional view taken along line C-C of FIG. 6, illustrating a state before the separator 4 is peeled off. In the third preferred embodiment, the same components as those described in the first and second preferred embodiments are denoted by the same reference numerals, and description thereof is omitted.

In third preferred embodiment, the planar light source device 20B includes cushioning sealing members 80B, as illustrated in FIGS. 6 and 7. The cushioning sealing member 80B includes the sealing material 1 and the cushioning material 3, but not the sealing material 2.

One end side of the sealing material 1 extends to, of the surface of the cushioning material 3 that faces the mold frame 22, at least one end side in the longitudinal direction of the cushioning material 3 so as to cover one end surface in the longitudinal direction of the cushioning material 3. Specifically, the sealing material 1 is attached to: the surface of the cushioning material 3 that faces the display panel 10; the one end surface in the longitudinal direction of the cushioning material 3; and the surface of the cushioning material 3 that faces the mold frame 22, so that the surface of the cushioning material 3 that faces the display panel 10, the one end surface in the longitudinal direction of the cushioning material 3, and the surface of the cushioning material 3 that faces the mold frame 22 are covered.

As described above, in the display apparatus 100 according to the third preferred embodiment, one end side of the sealing material 1 extends to, of the surface of the cushioning material 3 that faces the mold frame 22, at least the one end side in the longitudinal direction of the cushioning material 3 so as to cover the one end surface in the longitudinal direction of the cushioning material 3.

Therefore, when compared with the first and second preferred embodiments, the distance between the cushioning sealing member 80B and the adjacent cushioning sealing member 80B can be reduced since it is not necessary to provide an area where the one end portion 11 of the sealing material 1 is attached to the surface of the mold frame 22 by making the one end portion 11 protrude longer than the cushioning material 3. Thereby, foreign matters, entering an opening 221 of the mold frame 22 from the gap between the cushioning sealing member 80B and the adjacent cushioning sealing member 80B, can be reduced.

Fourth Preferred Embodiment

Figure 8:
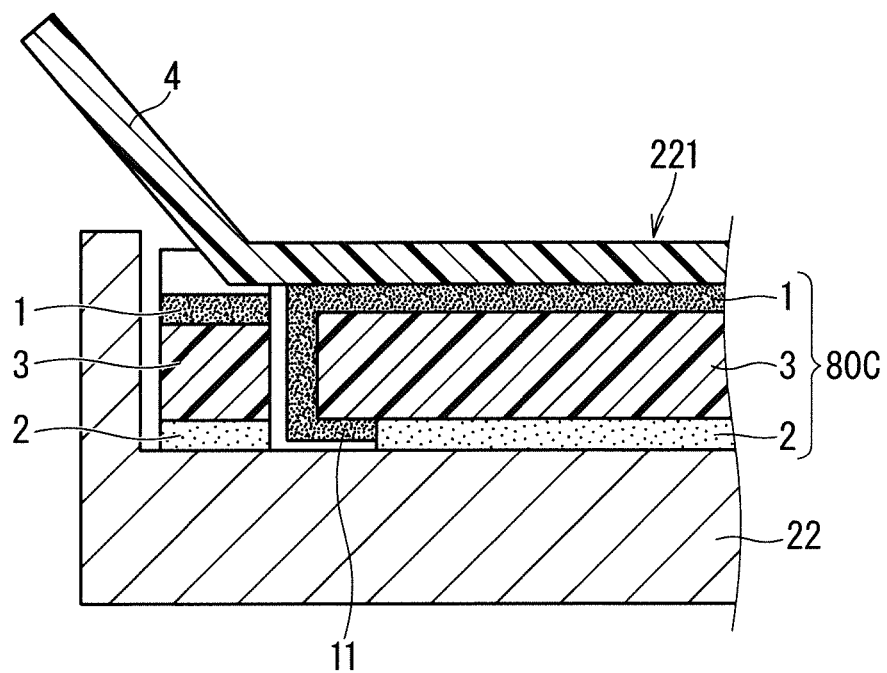
FIG. 8 is a view corresponding to FIG. 4, according to a fourth preferred embodiment.

Next, a display apparatus 100 according to a fourth preferred embodiment will be described. FIG. 8 is a view corresponding to FIG. 4, according to the fourth preferred embodiment. In the fourth preferred embodiment, the same components as those described in the first to third preferred embodiments are denoted by the same reference numerals, and description thereof is omitted.

In the fourth preferred embodiment, the display apparatus 100 includes a planar light source device 20C, and the planar light source device 20C includes four cushioning sealing members 80C, as illustrated in FIG. 8. The cushioning sealing member 80C further includes the sealing material 2 in addition to the cushioning sealing member 80B. One end side of the sealing material 1 extends to, of the surface of the cushioning material 3 that faces the mold frame 22, one end side in the longitudinal direction of the cushioning material 3 so as to cover the one end surface in the longitudinal direction of the cushioning material 3. The sealing material 2 is arranged in, of the surface of the cushioning material 3 that faces the mold frame 22, a portion excluding the one end side in the longitudinal direction of the cushioning material 3, and the sealing material 1 and the sealing material 2 are arranged at positions not overlapping each other in front view.

As described above, the display apparatus 100 according to the fourth preferred embodiment has the above configuration, and hence the distance between the cushioning sealing member 80B and the adjacent cushioning sealing member 80B can be reduced. Further, the cushioning material 3 can be sandwiched by two different types of the sealing materials 1 and 2, and hence foreign matters can be suppressed from entering the opening 221 of the mold frame 22, and sealing materials suitable for adherends can be selected.

Fifth Preferred Embodiment

Figure 9:
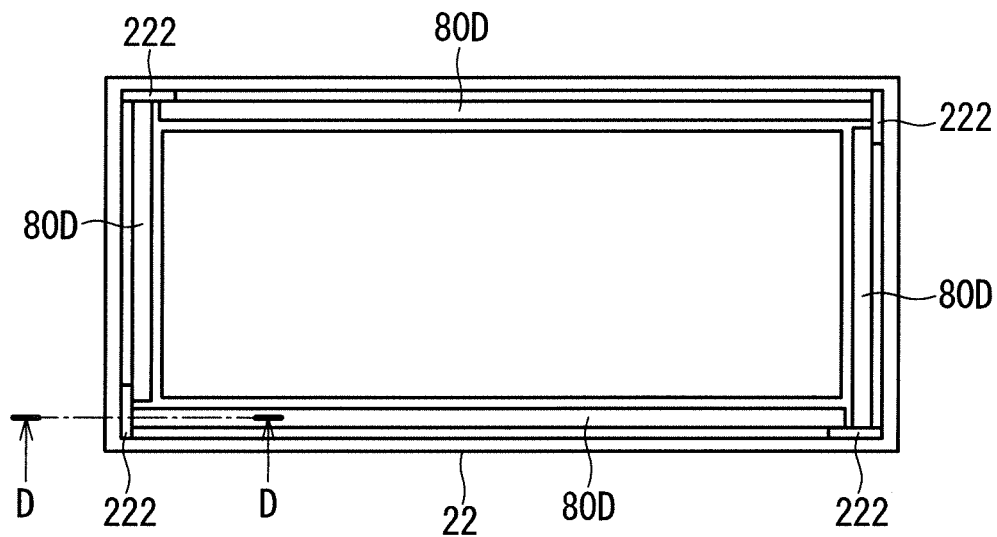
FIG. 9 is a front view of a planar light source device included in a display apparatus according to a fifth preferred embodiment.
Figure 10:
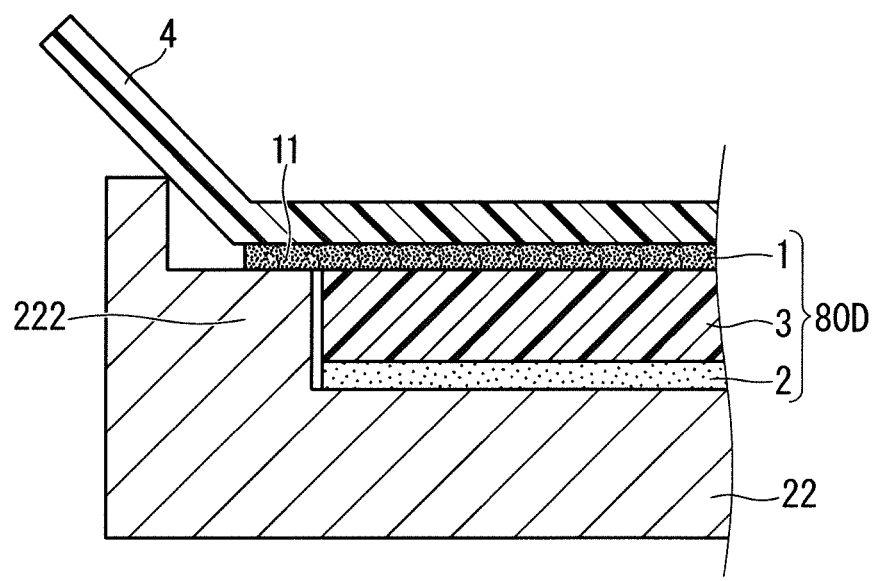
FIG. 10 is a cross-sectional view taken along line D-D of FIG. 9.

Next, a display apparatus 100 according to a fifth preferred embodiment will be described. FIG. 9 is a front view of a planar light source device 20D included in the display apparatus 100 according to the fifth preferred embodiment. FIG. 10 is a cross-sectional view taken along line D-D of FIG. 9. In the fifth preferred embodiment, the same components as those described in the first to fourth preferred embodiments are denoted by the same reference numerals, and description thereof is omitted.

In the fifth preferred embodiment, the planar light source device 20D includes cushioning sealing members 80D, as illustrated in FIGS. 9 and 10. The mold frame 22 has a protrusion 222 protruding toward the display panel 10 side. The protrusion 222 is formed at a position facing an end portion in the longitudinal direction of the cushioning sealing member 80D. Specifically, the protrusions 222 are formed around four corners of the mold frame 22.

As illustrated in FIG. 10, the height position of the surface of the protrusion 222, the surface being located on the display panel 10 side, is equivalent to the height position of the surface of the cushioning material 3, the surface being located on the display panel 10 side. One end side in the longitudinal direction of the sealing material 1 extends longer than one end side in the longitudinal direction of the cushioning material 3, and the one end portion 11 in the longitudinal direction of the sealing material 1 is attached to the surface of the protrusion 222 that faces the display panel 10.

As described above, in the display apparatus 100 according to the fifth preferred embodiment, the mold frame 22 includes the protrusion 222 that is formed at a position facing the end portion in the longitudinal direction of the cushioning sealing member 80D and that protrudes toward the display panel 10 side, and the one end portion 11 in the longitudinal direction of the sealing material 1 is attached to the protrusion 222. Therefore, it is not necessary to extend the one end side in the longitudinal direction of the sealing material 1 along the one end surface in the longitudinal direction of the cushioning material 3 and the one end surface in the longitudinal direction of the sealing material 2, and hence the cushioning sealing member 80D can be easily attached to the mold frame 22.

The height position of the surface of the protrusion 222, the surface being located on the display panel 10 side, is equivalent to the height position of the surface of the cushioning material 3, the surface being located on the display panel 10 side. Thereby, the one end portion 11 of the sealing material 1 can be easily attached to the protrusion 222 without applying stress such as bending the shape of the sealing material 1, even when and after the sealing material 1 is attached to the protrusion 222.

In the present invention, each preferred embodiment can be freely combined or can be appropriately modified or omitted within the scope of the present invention.

While the invention has been shown and described in detail, the foregoing description is in all aspects illustrative and not restrictive. It is therefore understood that numerous modifications and variations can be devised without departing from the scope of the invention.

What is claimed is:
1. A display apparatus comprising:
   a display panel;
   a mold frame constituting part of a planar light source device that irradiates the display panel from a back surface side; and
   a plurality of cushioning sealing members arranged, between the display panel and the mold frame, at positions corresponding to respective sides of the display panel, wherein:
   each of the cushioning sealing members includes a cushioning material, a first sealing material arranged on a surface of the cushioning material that faces the display panel, and a second sealing material arranged on a surface of the cushioning material that faces the mold frame;

one end side in a longitudinal direction of the first sealing material extends to the mold frame so as to directly cover one end surface in a longitudinal direction of the cushioning material and one end surface in a longitudinal direction of the second sealing material; and one end portion in the longitudinal direction of the first sealing material is directly attached to the mold frame.

2. A display apparatus comprising:

a display panel;

a mold frame constituting part of a planar light source device that irradiates the display panel from a back surface side; and a plurality of cushioning sealing members arranged, between the display panel and the mold frame, at positions corresponding to respective sides of the display panel, wherein:

each of the cushioning sealing members includes a cushioning material, a first sealing material arranged on a surface of the cushioning material that faces the display panel, and a second sealing material arranged on a surface of the cushioning material that faces the mold frame;

one end side in a longitudinal direction of the second sealing material extends longer than one end side in a longitudinal direction of the cushioning material;

one end side in a longitudinal direction of the first sealing material extends to the second sealing material so as to cover one end surface in the longitudinal direction of the cushioning material; and one end portion in the longitudinal direction of the first sealing material is attached to one end portion in the longitudinal direction of the second sealing material.

3. A display apparatus comprising:

a display panel;

a mold frame constituting part of a planar light source device that irradiates the display panel from a back surface side; and a plurality of cushioning sealing members arranged, between the display panel and the mold frame, at positions corresponding to respective sides of the display panel, wherein:

each of the cushioning sealing members includes a cushioning material and a first sealing material arranged on a surface of the cushioning material that faces the display panel; and one end side of the first sealing material extends to, of a surface of the cushioning material that faces the mold frame, at least one end side in a longitudinal direction of the cushioning material so as to directly cover one end surface in the longitudinal direction of the cushioning material.

4. The display apparatus according to claim 3, wherein:

each of the cushioning sealing members further includes a second sealing material arranged, of the surface of the cushioning material that faces the mold frame, in a portion excluding the one end side in the longitudinal direction of the cushioning material; and the first sealing material and the second sealing material are arranged at positions not overlapping each other.

5. A display apparatus comprising:

a display panel;

a mold frame constituting part of a planar light source device that irradiates the display panel from a back surface side; and a plurality of cushioning sealing members arranged, between the display panel and the mold frame, at positions corresponding to respective sides of the display panel, wherein:

each of the cushioning sealing members includes a cushioning material, a first sealing material arranged on a surface of the cushioning material that faces the display panel, and a second sealing material arranged on a surface of the cushioning material that faces the mold frame;

the mold frame includes a protrusion that is formed at a position facing an end portion in a longitudinal direction of the cushioning sealing member and that protrudes toward the display panel side; and an end portion in a longitudinal direction of the first sealing material is directly attached to the protrusion.

6. The display apparatus according to claim 5, wherein a height position of a surface of the protrusion, the surface being located on the display panel side, is equivalent to a height position of a surface of the cushioning material, the surface being located on the display panel side.

7. The display apparatus according to claim 1, wherein the first sealing material and the second sealing material are formed of materials having different adhesive strengths.

8. The display apparatus according to claim 2, wherein the first sealing material and the second sealing material are formed of materials having different adhesive strengths.

9. The display apparatus according to claim 4, wherein the first sealing material and the second sealing material are formed of materials having different adhesive strengths.

10. The display apparatus according to claim 5, wherein the first sealing material and the second sealing material are formed of materials having different adhesive strengths.

* * * * *